(12) United States Patent
Abhishek Raja

(10) Patent No.: US 11,513,966 B2
(45) Date of Patent: Nov. 29, 2022

(54) APPARATUS AND METHOD WITH VALUE PREDICTION FOR LOAD OPERATION

(71) Applicant: Arm Limited, Cambridge (GB)

(72) Inventor: . Abhishek Raja, Austin, TX (US)

(73) Assignee: Arm Limited, Cambridge (GB)

( * ) Notice: Subject to any disclaimer, the term of this patent is extended or adjusted under 35 U.S.C. 154(b) by 78 days.

(21) Appl. No.: 17/208,130

(22) Filed: Mar. 22, 2021

(65) Prior Publication Data
US 2022/0300430 A1 Sep. 22, 2022

(51) Int. Cl.
*G06F 12/0888* (2016.01)
*G06F 9/38* (2018.01)

(52) U.S. Cl.
CPC ........ *G06F 12/0888* (2013.01); *G06F 9/3842* (2013.01); *G06F 2212/602* (2013.01)

(58) Field of Classification Search
CPC ...... G06F 9/3836; G06F 9/3838; G06F 9/384; G06F 9/3842; G06F 12/0888; G06F 2212/602
See application file for complete search history.

(56) References Cited

U.S. PATENT DOCUMENTS

| 2021/0026632 A1 | 1/2021 | Dooley et al. |
| 2022/0027467 A1* | 1/2022 | Favor ...................... G06F 21/72 |
| 2022/0067154 A1* | 3/2022 | Favor .................... G06F 9/3838 |
| 2022/0137977 A1* | 5/2022 | Kothinti Naresh ... G06F 9/3834 |
| | | 712/205 |

* cited by examiner

*Primary Examiner* — Andrew J Cheong
(74) *Attorney, Agent, or Firm* — Nixon & Vanderhye P.C.

(57) ABSTRACT

An apparatus has processing circuitry, load tracking circuitry and value prediction circuitry. In response to an actual value of first target data becoming available for a value-predicted load operation, it is determined whether the actual value matches the predicted value of the first target data determined by the value prediction circuitry, and whether the tracking information indicates that, for a given younger load operation issued before the actual value of the first target data was available, there is a risk of second target data associated with that given load operation having changed after having been loaded. Independent of whether the addresses of the value-predicted load operation and younger load operation correspond, at least the given load operation is re-processed when the value prediction is correct and the tracking information indicates there is a risk of the second target data having changes after being loaded. This protects against ordering violations.

10 Claims, 8 Drawing Sheets

APPARATUS AND METHOD WITH VALUE PREDICTION FOR LOAD OPERATION

BACKGROUND

Technical Field

The present technique relates to the field of data processing.

Technical Background

A data processing apparatus may support load operations for loading data from a data store. The apparatus may support load value prediction, where a predicted value of data to be loaded by a given load operation is predicted before that data is actually obtained from the data store, to allow a dependent operation to be issued speculatively before the actual value of the data is available.

SUMMARY

At least some examples provide an apparatus comprising: processing circuitry to issue load operations to load data from a data store; load tracking circuitry to maintain tracking information for one or more load operations issued by the processing circuitry; and value prediction circuitry to determine a predicted value of first target data to be loaded from the data store by a value-predicted load operation specifying a first target address, to allow a dependent operation which depends on the first target data to be speculatively issued before an actual value of the first target data is loaded from the data store in response to the value-predicted load operation; in which: in response to the actual value of the first target data becoming available for the value-predicted load operation, at least one of the load tracking circuitry and the value prediction circuitry is configured to: determine whether the actual value of the first target data matches the predicted value of the first target data determined by the value prediction circuitry for the value-predicted load operation; determine whether the tracking information indicates that, for a given load operation younger than the value-predicted load operation and issued before the actual value of the first target data was available, there is a risk of second target data associated with a second target address of the given load operation having changed after the second target data was loaded by the given load operation; and independent of whether the first target address corresponds to the second target address, request re-processing of at least the given load operation when the actual value of the first target data is determined to match the predicted value of the first target data and the tracking information is determined to indicate that there is a risk of the second target data having changed after the second target data was loaded by the given load operation.

At least some examples provide a method comprising: maintaining tracking information for one or more load operations issued to load data from a data store; determining a predicted value of first target data to be loaded from the data store by a value-predicted load operation specifying a first target address, to allow a dependent operation which depends on the first target data to be speculatively issued before an actual value of the first target data is loaded from the data store in response to the value-predicted load operation; and in response to the actual value of the first target data becoming available for the value-predicted load operation: determining whether the actual value of the first target data matches the predicted value of the first target data determined by the value prediction circuitry for the value-predicted load operation; determining whether the tracking information indicates that, for a given load operation younger than the value-predicted load operation and issued before the actual value of the first target data was available, there is a risk of second target data associated with a second target address of the given load operation having changed after the second target data was loaded by the given load operation; and independent of whether the first target address corresponds to the second target address, requesting re-processing of at least the given load operation when the actual value of the first target data is determined to match the predicted value of the first target data and the tracking information is determined to indicate that there is a risk of the second target data having changed after the second target data was loaded by the given load operation.

Further aspects, features and advantages of the present technique will be apparent from the following description of examples, which is to be read in conjunction with the accompanying drawings.

DESCRIPTION OF EXAMPLES

Figure 1:
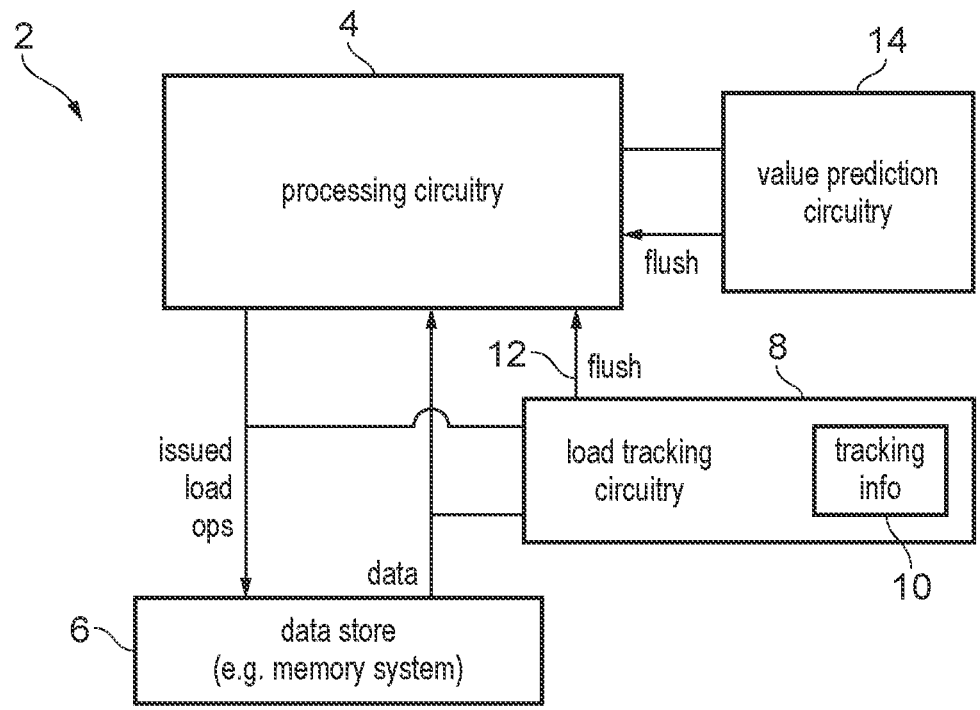
FIG. 1 schematically illustrates an example of a data processing apparatus having processing circuitry, load tracking circuitry and value prediction circuitry.

An apparatus has processing circuitry to issue load operations to load data from a data store (e.g. the data store could be a cache or memory). Load tracking circuitry maintains tracking information for one or more load operations issued by the processing circuitry. Value prediction circuitry is provided, to determine a predicted value of first target data to be loaded from the data store by a value-predicted load operation specifying a first target address. By predicting the value of the first target data, this allows a dependent operation which depends on the first target data to be speculatively issued before an actual value of the first target data is loaded form the data store in response to the value-predicted load operation.

In response to the actual value of the first target data becoming available for the value-predicted load operation, either the load tracking circuitry, or the value prediction circuitry, or a combination of the load tracking circuitry and the value prediction circuitry, may: determine whether the actual value of the first target data matches the predicted value of the first target data determined by the value prediction circuitry for the value-predicted load operation; determine whether the tracking information indicates that, for a given load operation younger than the value-predicted load operation and issued before the actual value of the first target data was available, there is a risk of second target data associated with a second target address of the given load operation having changed after the second target data was loaded by the given load operation; and independent of whether the first target address corresponds to the second target address, request re-processing of at least the given load operation when the actual value of the first target data is determined to match the predicted value of the first target data and the tracking information is determined to indicate that there is a risk of the second target data having changed after the second target data was loaded by the given load operation.

This approach might be seen as counter intuitive, since in the case where the value prediction for the value-predicted load operation is correct, one might assume that as the actual data matched the predicted value, there is no need to request re-processing of a subsequent load operation.

However, the inventor recognised that in a data processing apparatus supporting value prediction, even when the prediction is correct it possible that a memory ordering requirement could be violated in some circumstances. An example of a scenario where a memory ordering violation may occur as a consequence of a correct value prediction is described below with respect to FIG. 9. The ordering violation may arise because, when the load value prediction is correct, although a dependent operation uses the predicted value of the first target data at a first timing, the prediction is confirmed by checking the actual value of the first target data at a second timing, and in between the first target data could have changed. If the dependent operation also depends on other target data from the data store, this could lead to the dependent operation being executed using values of the first target data and other target data which are inconsistent with architectural ordering constraints imposed by code updating the first and other target data, and this ordering violation may not have arisen if value prediction had not been used.

One option for dealing with this problem may simply be to suppress use of value prediction in scenarios where the ordering violation could arise. However, this would harm performance as the ordering violations may be relatively rare and this would eliminate the benefit of value prediction of allowing dependent operations to execute earlier than if they had to wait for the actual value of the first target data.

This problem can be addressed by checking, for a value-predicted load operation for which the actual value of the first target data has been determined to match the predicted value, whether the tracking information maintained by the load tracking circuitry indicates that, for a given load operation younger than the value-predicted load operation and issued before the actual value of the first target data was available, there is a risk of second target data associated with the target address of the given load operation having changed after being loaded by the given load operation, and if this is the case then independent of whether the first target address corresponds to the second target address, at least the given load operation can be re-processed in this scenario. Hence, this technique allows value prediction to be supported in a system where such memory ordering violations could arise.

Note that the given load operation may itself be a value-predicted load for which a value prediction is made, or could be a non-value predicted load which is not subject to value prediction.

In the example above, the re-processing of at least the given load operation occurs based on the determination that the actual value matched the predicted value of the first target data for the value-predicted load, and the determination that the tracking information indicated a risk of the second target data having changed after being loaded by the given load operation younger than the value-predicted load, and the determination of whether to re-process the given load operation in this scenario may be independent of whether the first and second target addresses correspond. However, in some implementations additional criteria may also be applied for deciding whether to re-process the at least the given load operation.

For example, the memory ordering violation which could be caused by the value prediction may arise only if the given load operation younger than the value-predicted load operation actually depends on the value-predicted load operation. If there is no dependency between an operand of the given load operation and an output of the value-predicted load operation then there may be no need to re-execute a subsequent load operation even if there was a risk of target data loaded by that subsequent load operation changing. Hence, in some implementations, an additional criteria for deciding whether to re-process at least the given load operation may be to check for dependencies between the value-predicted load operation and subsequent load operations.

However, in practice tracking such dependencies may be more complex to implement in circuit hardware and some implementations may choose to simplify the circuit implementation by not tracking those dependencies in the tracking information maintained by the load tracking circuitry, so that in that case the determination of whether the given load operation should be reprocessed may be independent of whether the given load operation is actually dependent on the value-predicted load operation. This may recognise that, although the address ordering violation may only occur in the case when the given load operation is dependent, in practice it is not a problem from a functional result point of view to flush and re-process additional operations which were not dependent on the value-predicted load operation, as this will merely affect performance but will not change functional correctness or compliance with any ordering requirements of the architecture. Therefore, it is possible to over-flush in a conservative manner when there is an operation which could potentially encounter the violation, even if the exact circumstances for the violation to occur have not been identified. As the scenarios when a risk of an ordering violation is detected may be relatively rare, occasionally overflushing may not cause a significant performance penalty, and there may be a greater benefit in obtaining power and circuit area savings by a simpler circuit implementation which does not need to perform dependency checks. Hence, it is not necessary to implement dependency checks between older and younger operations for checking whether, on a correct value prediction, a younger operation should be flushed and re-executed to avoid a potential ordering violation caused by the value prediction.

Similarly, whether the address ordering violation actually occurs may in some cases dependent on program execution at another processing element of the data processing system and the exact operations being performed at that processing element may be unknown to the processing circuitry associated with the load tracking circuitry, so again a conservative estimate may be used and it may not be necessary to detect whether the circumstances at the other processing element are such that the violation would actually occur. In a scenario where at least the actual value of the first target data is determined to match the predicted value of the first target data and the tracking information is determined to indicate there is a risk of the second target data having changed after the second target data was loaded, then the given load operation may be reprocessed (without checking whether program code executed elsewhere is such that there would actually have been any chance of the ordering violation occurring).

When a mismatch is detected between the actual value of the first target data and the predicted value of the first target data, at least one of the load tracking circuitry and the value prediction circuitry may request re-processing of at least one operation younger than the value-predicted load operation. Hence, this scenario corresponds to a misprediction of the first target data, and so subsequent operations which depend on the predicted value may have been incorrectly executed and so should be flushed and re-executed. In practice, it may be costly in terms of circuit area and power to check exactly which younger operations depend on the predicted data value and so may be simpler simply to flush and re-execute any younger operation than the value-predicted load operation and re-execute them (with dependent operations then using the actual value of the first target data). When a mismatch is detected between the actual value of the first target data and the predicted value of the first target data, the decision on whether a younger operation should be re-processed may be independent of whether the tracking information indicates there is a risk of target data loaded by a younger load operation having changed after being loaded.

Note that for the case where the value prediction was incorrect, the at least one operation that is flushed and reprocessed may include both load operations and non-load operations, since it is also possible that non-load operations may have been dependent on the value prediction.

In contrast, for the case when the value prediction was correct and the given load operation is re-processed to avoid risk of a memory ordering violation as discussed above, it may not be essential to also flush non-load operations, as the problem with the given load operation is not that it could have used the incorrect input value but that memory ordering requirements may have been violated and these ordering requirements may not apply to non-load operations.

Nevertheless, for simplifying the circuit implementation, in some cases in the case where the predicted and actual values of the first target data match and the tracking information indicates a risk of the second target data having changed, then it may be simpler to request re-processing of a younger operation than the value-predicted load operation regardless of whether it is a load or non-load operation. This can simply circuit implementation because it is not necessary to track dependencies between instructions (which may be needed if only load operations were to be flushed, but non-load operations independent of those loads were not flushed, as other operations dependent on those loads would also need to be flushed). Also, simply flushing and re-executing younger operations regardless of whether they are a load or not can be simpler as it means a common mechanism for requesting flushing and re-execution of instructions can be used, shared with other reasons for flushing/re-executing instructions, such as due to a load value misprediction described above, or due to other types of misprediction for speculative operations, such as a branch misprediction.

Also, in some implementations when (in the case of a correct value prediction when the actual and predicted values of the first target data matched), the point of the program from which younger operations are re-executed may be the given load operation younger than the value-predicted load operation, for which the tracking information indicated that there was a risk of the second target data having changed since being loaded. Hence, it would not be essential to flush and re-execute operations which are younger than the value-predicted load operation, but older than the given load operation.

Hence, in some examples when, for the value-predicted load operation, the actual value matches the predicted value of the first target data and the tracking information indicates the risk of the second target data having changed, at least one of the load tracking circuitry and the value prediction circuitry may request re-processing of any already issued load operation younger than the value-predicted load operation (and as mentioned above, in some cases non-load instructions younger than the value-predicted load operation may also be flushed and re-processed). Again, this can simplify circuit implementation as it means the operations to be flushed following a correct value prediction to avoid risk of ordering violation may be the same as the operations to be flushed following an incorrect value prediction, allowing a common mechanism to be used to request both kinds of flush, and therefore reducing circuit area and power consumption.

In some examples the processing circuitry may support defining some load operations as a load operation having acquire semantics. A load having acquire semantics may impose a memory ordering requirement on younger load operations which specify a different target address to the target address of the load having the acquire semantics. For example, the load with acquire semantics may act as a barrier operation which may require that the younger load operations should not bypass (be executed out of order ahead of) the load with acquire semantics, even if those younger load operations specify a different target address to the address of the load with acquire semantics. This differs from loads not having acquire semantics where, in the absence of any other memory order requirements enforced by earlier instructions, it would be allowable to permit a younger load specifying one address to be processed ahead of the load without acquire semantics. The terms "younger" and "older" refer to the order of the instructions in program order, which may be an order in which the instructions would be executed if instructions were executed sequentially in the logical order in which they are encountered within a given program. Program instructions may be fetched from an instruction cache in program order but, in an out-of-order processor, may be executed out of order so that a younger operation which is independent of older operations may be processed ahead of an older operation if the older operation is stalled awaiting an operand.

Hence, loads which have acquire semantics and therefore impose an ordering requirement on younger load operations may also need a check of whether there is a younger load operation which has been processed ahead of the load with acquire semantics where there is a risk of the target data loaded by the younger load operation having changed after being loaded. The tracking information maintained by the load tracking circuitry may also be used for checking for ordering violations for loads with acquire semantics.

Hence, in one approach the checks performed for the value-predicted load operation may reuse the tracking information provided for tracking other types of ordering violations such as those for loads with acquire semantics. Hence, one way of implementing the check for the value-predicted load can be that, in the confirmation pass for confirming the value prediction for the value-predicted load (the confirmation pass being performed when the actual value of the first target data has become available and is compared against the predicted value to check whether the prediction was correct), the value-predicted load can be treated as a load with acquire semantics, so that the value-predicted load can reuse the same tracking mechanism as the load with acquire semantics (even if the value-predicted load operation is not itself a load with acquire semantics) and therefore trigger an extra check of whether there is a risk of a younger load to a different address having loaded second target data which could have changed after being loaded and could potentially lead to a violation of ordering requirements. This approach can simplify the implementation of the circuit design and reduce overall circuit area and power cost.

On the other hand, for a non-value-predicted load operation which specifies a third target address and does not itself have acquire semantics (so does not impose a memory ordering requirement on younger load operations specifying a different target address to a third target address specified by that non-value-predicted load), when the tracking information indicates that there is a risk of target data loaded by a younger load operation having changed after being loaded, the load tracking circuitry may determine whether to request re-processing of at least the younger load operation depending on whether a target address of the younger load operation corresponds to the third target address of the non-value-predicted load operation. For loads without acquire semantics there may be an architectural ordering requirement to prevent younger loads for a given address bypassing older loads for the same address, but there may be no need to prevent a younger operation bypassing an older load if its target address is different to the target address of the older load, and so hence to avoid unnecessary flushing too many operations, for loads without acquire semantics the check of whether to re-process at least the younger load operation may depend on a comparison of the addresses. Note that in some implementations the tracking information maintained by the load tracking circuitry may track target addresses of loads at a relatively coarse granularity (e.g. at granularity of a cache line, rather than individual byte addresses) and so the comparison of the target addresses could identify the target addresses as corresponding even if the actual target addresses are to different bytes, if both target addresses are in the same cache line or other sized granule of address space as tracked by the tracking information.

Hence, the check performed for the value-predicted load operation on a correct value prediction may differ from the checks performed for non-value-predicted load operations without acquire semantics, in the sense that the check performed for the value-predicted load operation when the prediction is correct may be independent of a comparison between the first target address and second target address, whereas a check for the non-value-predicted load operation without acquire semantics may depend on a comparison between the target address of the younger load operation and the third target address of the non-value-predicted load operation. Hence, there is no need to perform any comparison of addresses when performing the check for the value-predicted load operation in the case of a correct prediction for deciding whether to flush and re-process a younger given load operation, or alternatively the comparison could still be performed but the determination of whether to re-process may not depend on that comparison. In practice, however, power can be saved by not performing the comparison at all.

The load tracking circuitry may maintain the tracking information in various ways. The format of the tracking information could vary significantly from implementation to implementation. Hence, a particular format of the tracking information is not an essential feature of the technique described above, and in practice any information which would allow the load tracking circuitry or value prediction circuitry to evaluate whether there is a risk of the second target data having changed may be used.

However, in one example the load tracking circuitry may maintain, as the tracking information, a tracking structure comprising one or more tracking entries where each tracking entry that was allocated for an issued load operation specifies at least: an age indicator indicative of relative age of the issued load operation; address information indicative of an address of the issued load operation; and a hazard indication indicative of whether a hazard condition has been detected for the issued load operation.

With this format, the hazard indication for a given tracking entry of the tracking structure may be set to indicate that the hazard condition has been detected, in response to detecting a coherency snoop request specifying a snoop address corresponding to the address information specified by the given tracking entry.

The at least one of the load tracking circuitry and the value prediction circuitry could determine that the tracking information indicates there is a risk of the second target data having changed after being loaded by the given load operation when the tracking structure indicates a hazarding tracking entry for which the age indication indicates a younger load operation than the value-predicted load operation and the hazard indication indicates that the hazard condition has been detected for the younger load operation. In scenarios where, when the value prediction was correct for the value-predicted load operation, but there is no younger load indicated in any valid tracking entry of the tracking structure, or where any younger load operations appearing in the tracking structure do not have hazard indications set, then there may be no need to flush and re-execute any younger load operations since in that case there may be no risk of the value prediction causing incorrect results in violation of an ordering requirement.

This approach to using the tracking information can be useful because it recognises that, although at an architectural level certain ordering constraints may be imposed on load operations to maintained synchronisation between operations executed on different processing elements or in different threads, in practice sometimes it may be allowed to execute load operations in an order which differs from the strict order defined in the architecture, as long as there has not been an intervening data access which could have changed the data in the period within which this would have a material effect on the eventual result of processing a sequence of instructions. As long as such data does not change, then even if the operations are executed in an order which is incorrect from an architectural view, as long as the end result is the same then this will not be observed by any subsequent instructions and so can be allowed to proceed without instructions being flushed and re-executed. Hence this approach can improve performance because it means that the processor can have greater flexibility to re-order operations in violation of any architectural ordering constraints where that would help to improve performance by utilising spare processor resource for a younger operation while waiting for an older operation to be unstalled. When handling the value-predicted load operations, a similar approach can be used and so the mere execution of load operations in an order which violates the ordering constraints may not be a problem as long as there is no risk that relevant data has changed and so this can be why the check described above checks an indication of whether the second target has changed.

The techniques discussed above can be applied within an individual processor core. Even in a processor which only has a single processor core, the design of the processor core may be intended for use in multi-processor systems as well and so that single processor core could have the load tracking circuitry and value prediction circuitry discussed above.

However, in practice the ordering violation which occurs following a correct prediction of a value-predicted load may be more likely to occur in systems which have two or more different processing elements (e.g. CPUs, GPUs or other processor cores) which share access to a shared data store, where each of the processing elements has the processing circuitry mentioned earlier and at least one of the processing elements has the load tracking circuitry and the value prediction circuitry mentioned earlier. It is not necessary for every processing element in the system to include the load tracking circuitry and the value prediction circuitry. Some processing elements may not support value prediction. In a system having multiple processing elements, it may be more likely that the value prediction made by one processing element could result in a violation of ordering requirements which are imposed by instructions being processed by another processing element, and so the technique discussed above can be particularly useful in a system with multiple processing elements FIG. 1 schematically illustrates an example of a data processing apparatus 2 which has processing circuitry 4 for performing data processing in response to instructions, a data store (e.g. memory system, which could include one or more caches and memory) 6 for storing instructions to be processed by the processing circuitry 4 and data for access by the processing circuitry 4, and load tracking circuitry 8 which tracks load operations issued by the processing circuitry 4 in response to load instructions and maintains tracking information 10 providing information about those issued load operations. For example, the tracking information 10 can be used to check whether any memory ordering requirements associated with the load operations are satisfied. If a violation of a memory ordering requirement is detected which has the potential to produce incorrect processing results then a flush signal 12 can be sent by the load tracking circuitry 8 to the processing circuitry 4 to request that the processing circuitry 4 is flushed of instructions younger than the point of execution associated with the violation, and the processing circuitry 4 restarts execution of instructions from a point of program flow up to which earlier processing was carried out correctly, where the re-executed instructions will include at least those instructions affected by the violation of the memory ordering requirement (in practice, other instructions not affected by the violation may also be flushed and re-executed to simplify circuit implementation by avoiding needing to implement checks for exactly which instructions may have been affected). While FIG. 1 illustrates parts of the system for handling load operations, it will be appreciated that the processing circuitry 4 also supports other types of processing operations.

The apparatus 2 also has value prediction circuitry 14 for predicting values of data to be loaded by a value-predicted load operation, before the actual data for that load is available from the data store 6. For example the value prediction circuitry 14 may store prediction state information which may be updated to indicate data values observed for loads on previous instances of executing the load, and the stored prediction state may be used to predict the data to be loaded when the same loads are encountered in future. In some examples, a confidence counter may be used for example to track how many times the predicted data value has been seen and once confidence exceeds a given threshold then the prediction may start to be used so that subsequent instructions dependent on the value-predicted load can be executed speculatively based on the predicted value before the actual data is available from the data store 6. The predicted data values could be tracked in the value prediction circuitry in association with program counter addresses of load instructions or in association with the target address of the load. Any known value prediction scheme may be used and so the techniques discussed below are not limited to a particular value prediction technique or a particular format of the prediction state information used to provide data value predictions. Load value prediction helps to break dependency chains and improves performance because if a given load is stalled due to awaiting operands or is a long latency load which takes a long time to service from the data store 6, subsequent dependent instructions can proceed based on the predicted value and if the prediction is correct then this will improve performance. If the prediction turns out to be incorrect then the value prediction circuitry 14 may send a flush signal to the processing circuitry 4 to cancel the effects of the mispredicted data value and cause younger instructions than the value-predicted load operation to be flushed from the processing pipeline and re-executed.

Figure 2:
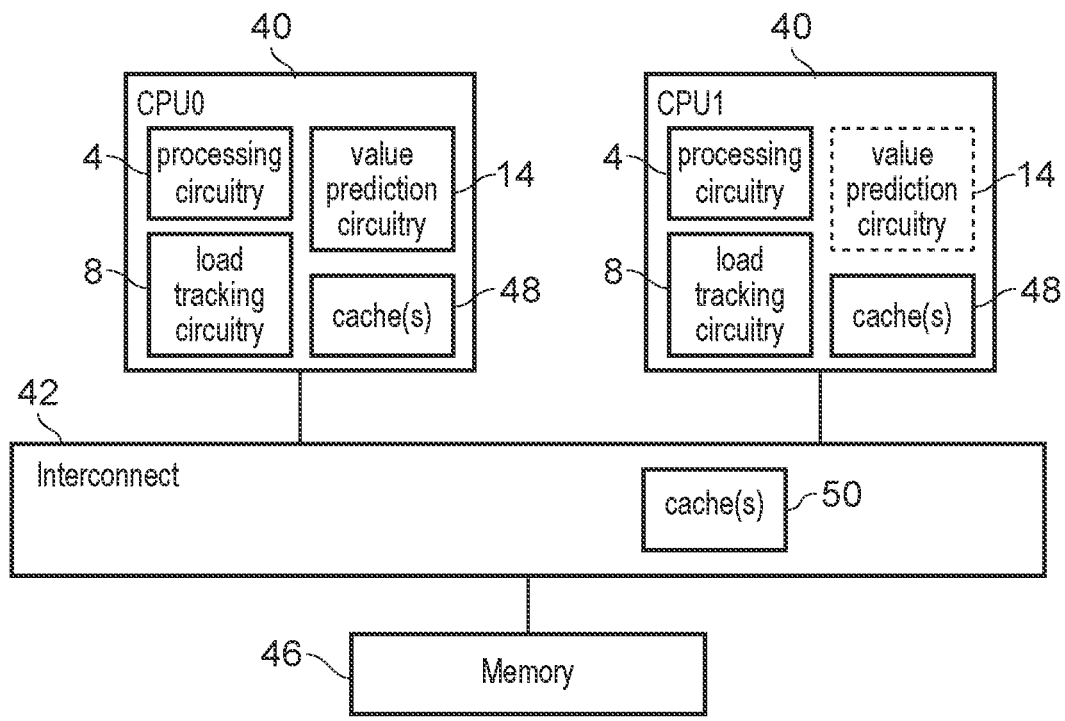
FIG. 2 illustrates an example of a data processing system.

FIG. 2 shows an example of a data processing system which includes a number of processing elements 40, which are capable of executing program instructions defined according to an instruction set architecture. In this example there are two central processing units (CPU) 40, but other examples could have a different number of processing elements and could include processing elements other than CPUs, such as a graphics processing unit (GPU) for example. Each of the processing elements has the processing circuitry 4 and load tracking circuitry 8 as discussed above. At least one of the processing elements has the value prediction circuitry 14. As shown by the dotted lines in CPU 1 in FIG. 2, it is not essential for every processing element to have the value prediction circuitry 14.

The processing elements 40 are coupled via an interconnect 42 which may route communications between the processing elements 40 and memory 46. The interconnect 42 may also manage coherency between data from memory 46 that is cached in various caches 48, 50, including one or more private caches 48 associated with an individual processing element 40 and one or more shared caches 50 shared between the processing elements 40. The caches 48, 50 and memory 46 collectively make up the memory system shown as the data store 6 in the example of FIG. 1.

Figure 3:
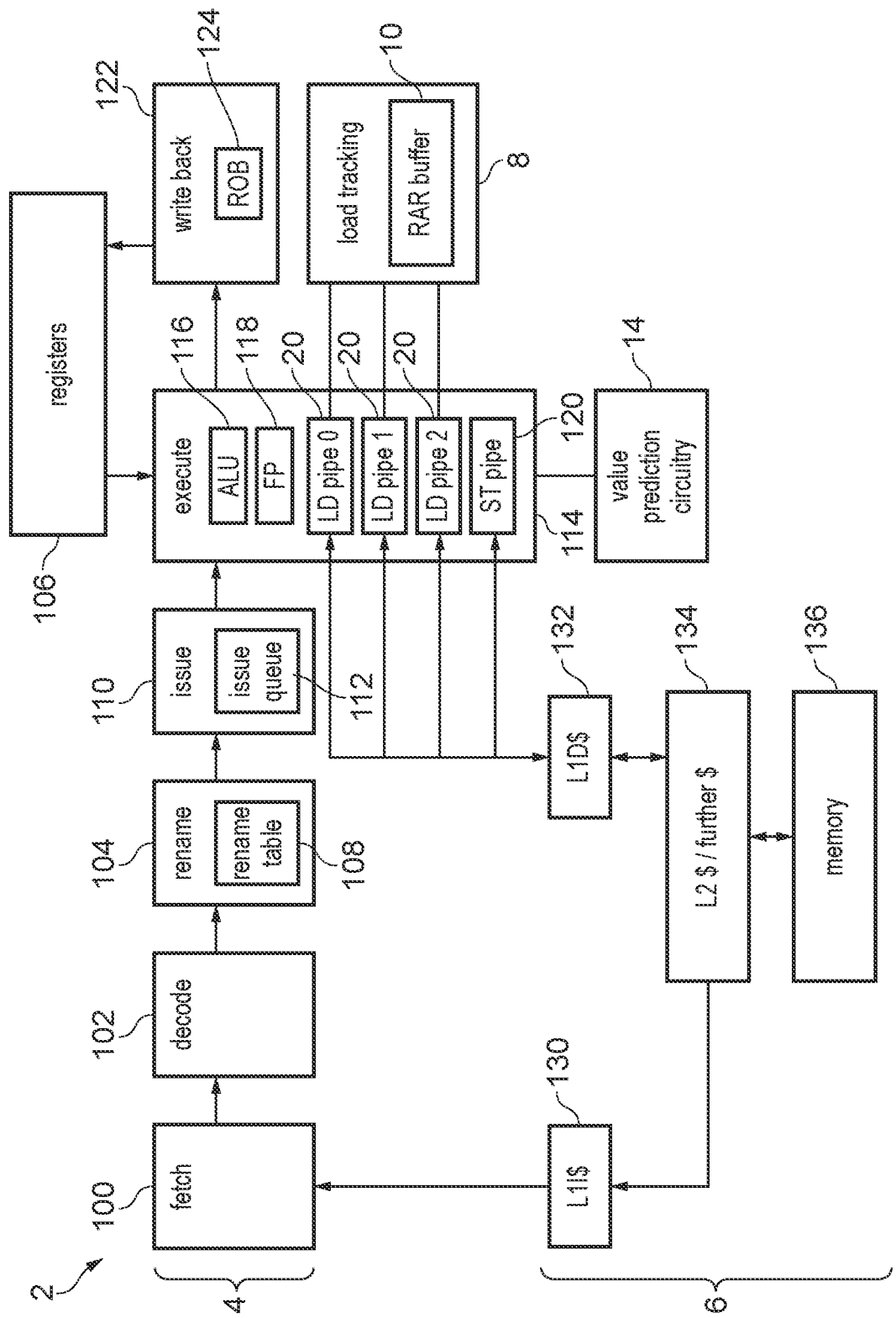
FIG. 3 illustrates features of the apparatus in more detail.

FIG. 3 shows in more detail an example of the data processing system 2 shown in FIG. 1. Again, the system comprises processing circuitry 4, a memory system 6, the load tracking circuitry 8 and the value prediction circuitry 14.

The processing circuitry 4 comprises a processing pipeline with a number of pipeline stages. Instructions progress down the pipeline and at each stage a certain part of the instructions processing is carried out. In this example the pipeline 4 is an out-of-order pipeline which supports instructions being executed in a different order from the program order in which they are stored in the memory system 6.

The pipeline stages in this example include a fetch stage 100 for fetching instructions from the memory system 6, a decode stage 102 for decoding the fetched instructions to identify the operations to be performed and to generate control signals for controlling later pipeline stages to perform the corresponding operations, a register rename stage 104 for mapping architectural register specifiers specified by the instructions to physical registers 106 provided in hardware, using rename mappings tracked using a rename table 108; and an issue stage 110 for retaining issued instructions or micro-operations in an issue queue 112 until their required operands are available and selecting instructions for issuing for execution once the operands are available. As this is an out-of-order pipeline, the issue stage 110 supports the instructions being issued in a different order from the order in which they were fetched by the fetch stage 100, so that if an older instruction (which appears earlier in the program order) is stalled awaiting its operands then a younger instruction (which appears later in the program order) whose operands were already available can be issued ahead of the older instruction.

The pipeline 4 includes an execute stage 114 which includes a number of execution units for executing the processing operations corresponding to the issued instructions or micro-operations. The execute stage 114 includes a number of execution units of different types for executing different classes of instructions, such as an arithmetic/logic unit 116 for executing arithmetic/logical instructions on integer operands, a floating-point execution unit 118 for executing floating-point operations involving operands represented as floating-point numbers, as well as other types of execution unit not shown in FIG. 3 for executing other types of processing operations, such as vector processing, branch operations etc. The execution units may also include a number of load pipelines 20, as well as one or more store pipelines 120 for carrying out store operations to store data from the registers 106 to the memory system 6. It will be appreciated that the particular set of execute units shown in FIG. 3 is just one example and other examples may have different types of execution units or may provide different numbers of execution units of any of the types shown in FIG. 3.

At least for some execute units, when the instructions are executed by a given execute unit, the execute unit generates a result which can be written back to registers 106 by a write back stage 122 of the pipeline. The write back stage may maintain a re-order buffer 124 for tracking commitment of executed instructions based on their execution order and their program order, so that an instruction becomes committed once it has executed and any earlier instructions in the program order have also committed.

It will be appreciated that the processing system 2 could also have many other elements not shown in FIG. 3, such as a branch predictor or memory management unit. In this example the memory system 6 includes a level 1 instruction cache 130, level 1 data cache 132, a shared level 2/further cache 134 and main memory 136, but it will be appreciated that other memory hierarchies could be used, for example with further levels of cache or a different sharing relationship between the instruction caches and the data caches.

Also, in a multi-processor-core system such as the one shown in FIG. 2, other processing elements 40 with a similar configuration to the one shown in FIG. 3 could share access to the same memory 46, 136, and coherency mechanisms may be used to maintain coherency between the respective caches in the different processing elements, for example using a coherent interconnect providing a snooping mechanism, which generates snoop requests sent to caches 130, 132, 134 associated with one processing element when another processing element issues a request for data. Any known coherency control mechanism may be used for this.

Figure 4:
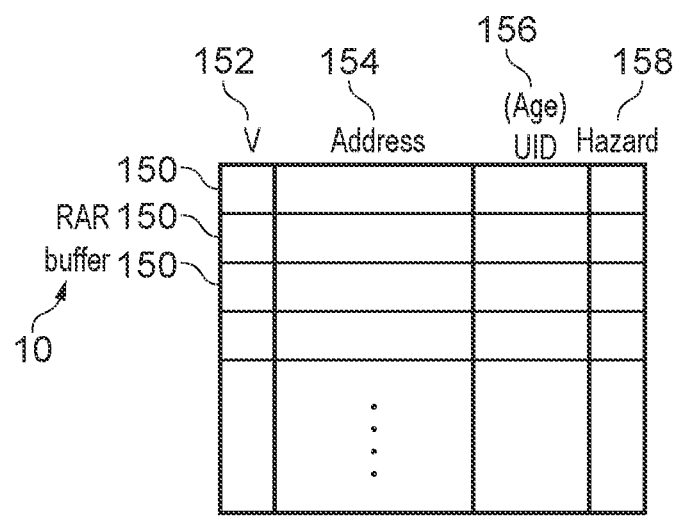
FIG. 4 illustrates an example of a read after read (RAR) buffer.

As shown in FIG. 3, the load tracking circuitry 8 may maintain, as a specific example of the tracking information, a read after read (RAR) buffer 10. FIG. 4 illustrates an example of the RAR buffer 10 in more detail. The RAR buffer 10 may comprise a number of tracking entries 150 which each specify: a valid indication 152 indicating whether the corresponding entry 150 is valid, an address 154 of a corresponding load operation processed by the load pipelines 20, an instruction identifier 156 (UID or unique instruction identifier) which identifies the instruction corresponding to that load operation, and a hazard indication 158 indicating whether a hazard has been detected for the corresponding load operation. Memory ordering requirements of different types may be enforced on load operations, for example enforcing that an earlier load cannot bypass a later load to the same address, or a requirement that if a data synchronisation barrier (DSB) instruction is executed then a younger instruction than the barrier cannot be observed to be executed before an instruction which is older than the barrier. The UID 156 may be treated as an indication of the relative age of the instructions corresponding to process load operations. Allocation of the UID to particular instructions could be done by one of the stages of the pipeline 4, such as the fetch stage 100, decode stage 102 or rename stage 104, within the portion of the pipeline where instructions are still being processed in program order for example. For example each time a new instruction is fetched the fetch stage 100 could allocate the next UID value 156 to that instruction. The UIDs may be an indication of relative age of the instructions in program order, e.g. being allocated in age order.

The RAR buffer 10 may be searchable either by address 154 or by UID 156, so that when a given load operation is processed, the load tracking circuitry 8 can detect whether there is a valid entry in the RAR buffer for the same address 154 and/or whether the RAR buffer 10 already includes a valid entry for the same or younger UID 156. The address field 154 could specify either: a full physical address (PA), a portion of the full PA which identifies a cache line, or a hash value derived from the full PA or portion of the PA using a hash function which may map the PA (or cache line identifying portion of the PA) to a hash value having fewer bits than the PA, so that multiple PAs may alias onto the same hash value, leading to a potential for false positive detections of address hazarding. Hence, for the purpose of comparing an address stored in the RAR buffer 10 and an address of a load operation or snoop, the addresses may be considered to be "corresponding" in any of the following cases: the addresses are the same; cache line portions of the addresses are the same; or the addresses are different but are aliasing addresses which are both mapped to the same hash value by the hash function.

Figure 5:
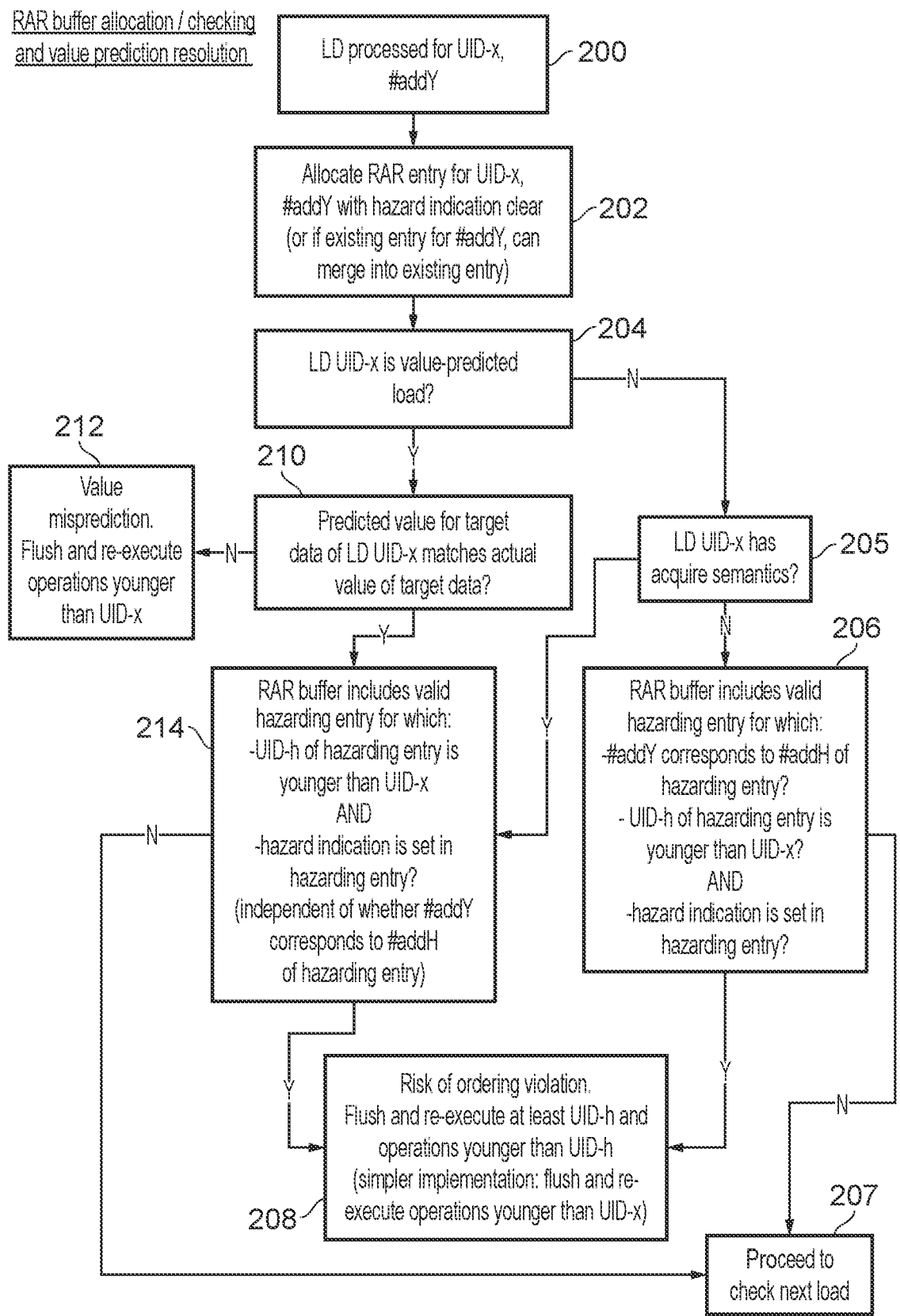
FIG. 5 is a flow diagram illustrating maintenance of load tracking information in the RAR buffer and checking for whether an ordering violation may have occurred.

FIG. 5 is a flow diagram showing use of the RAR buffer for tracking load operations and checking for hazards that could cause memory ordering violations, as well as checking whether value predictions are correct.

At step 200 the load tracking circuitry 8 detects that a load operation is processed with specifies a given UID (UID-x) and a certain target address #addY.

In response, at step 202 the load tracking circuitry allocates a new RAR buffer entry, with the valid bit 152 set, the address field 154 set based on target address #addY, the age indication 156 set based on UID-x, and the hazard indication 158 initially clear. Alternatively, if there is an existing entry for address #addY it is possible to merge the new request in to the existing entry, for example by updating the age field 156 to specify the UID of the younger UID of the UID currently in the age field 156 of the merged entry and the UID-x of the load currently being processed. If the load operation is a value-predicted load, the operations shown in FIG. 5 may be performed at the time of the confirmation pass of the value-predicted load, when the actual value of the target data has become available and is ready for comparison against the predicted value performed by a value prediction. Hence, the allocation of the RAR entry may take place at the time of performing the confirmation pass, rather than the time when the predicted value of the target data is determined for the value-predicted load.

At step 204 the load tracking circuitry 8 or value prediction circuitry 12 (or a combination of the two) checks whether the load operation UID-x is a value-predicted load for which the value prediction circuitry 14 predicted a value of the target data to be loaded by that instruction. If the load is not a value-predicted load then at step 205 the load tracking circuitry 8 determines whether the load has acquire semantics. A load with acquire semantics may be a load which imposes a memory ordering requirement on younger load operations which specify a different target address to the target address of the load with acquire semantics. In some cases there may be dedicated types of load operations, e.g. based on execution of a load-acquire instruction which has a different encoding to other types of load instruction. For example, the load-acquire instruction could be identified based on the opcode of the load instruction, to cause the load to be treated as having acquire semantics.

If the load operation does not have acquire semantics then at step 206 the load tracking circuitry 8 checks for hazarding entries which may signal a possible memory ordering violation. This is because an architectural order requirement may be that when performing out of order processing it may not be allowed, from an architectural view, for a younger load to bypass an older load for the same address, but in practice, violating this order and requirement may not be a problem unless a hazard has been detected indicating that the data for that address may have been updated elsewhere in the system (e.g. this can be detected based on snoop requests sent by the interconnect 42 according to a coherency protocol). If a hazard is detected, then the ordering violation may cause incorrect functional results. Hence, as long as there has been no hazard detected then the loads may be allowed to proceed even if there is a technical violation of the ordering requirement, whereas if there is an incorrect order of processing loads in violation of the ordering requirement and the hazard has been detected and this may be a problem and a flush may be triggered.

Hence, at step 206 the load tracking circuitry 8 detects whether the RAR buffer 10 includes a valid hazarding entry for which all of the following requirements are satisfied:

The address #addY corresponds to an address #addH in the address field 154 of the hazarding entry (note that the addresses #addY and #addH need not correspond to exactly the same byte of data in memory, but may be considered to correspond if any part of the block of data required for the load to address #addY overlaps with any part of the block of data indicated by address #addH, or if the addresses #addY, #addH share the same hash value in implementations which use a hash function to compress the address stored in the RAR buffer);

The UID field 156 of the hazarding entry specifies an instruction identifier UID-h which indicates a younger instruction than the instruction identified by UID-x as specified for the current load encountered at step 200; and The hazard field 158 for the hazarding entry has been set to indicate that a hazard was detected.

If a hazarding entry is identified in the RAR buffer 10, for which all of these three requirements are satisfied, then at step 208 a risk of a memory ordering violation is detected as this may be an indication that instructions or load operations were processed in an order which is inconsistent with an order imposed by an architectural memory ordering requirement and the presence of the hazard indication indicates that this has a potential to cause incorrect processing results. Hence, at step 216 the load tracking circuitry issues the flush signal 12 to the processing circuitry 4 to request flushing of instructions younger than UID-x from the pipeline and re-execution of instructions. The flushed instructions may include at least the instruction identified by UID-h in the age field 156 of the hazarding entry 150 and younger instructions than the instruction with UID-h. Note that in this case the instruction identified by the UID-x of the current load does not need to be flushed and re-executed.

In practice, while to mitigate against the potential risk of ordering violation, it is sufficient that the pipeline 4 is flushed of at least the instructions starting from instruction UID-h for which the hazard is detected and it is not necessary to flash and re-execute instructions which appear in program order between the load UID-x and the hazarding load UID-h, and in implementations which do not support merging of entries for the same address as explained above for step 202, this can be feasible, it may nevertheless be simpler to implement a system where whenever a flush is needed then the flush is triggered from the load UID-x which is currently being compared against the contents of the RAR buffer, and so in this case any operations younger than UID-x may be flushed, even if they are older than the operation with UID-h which encountered the hazard. In implementations which do support merging of RAR buffer entries for the same address, the indication of UID-h cannot be relied upon to determine the point to flush from because there may have been a load older than UID-h but younger than UID-x that bypassed the load with UID-x. Hence, for implementations which do support merging of RAR buffer entries for the same address, at step 208 any operations younger than UID-x may be flushed, even if they are older than the operation with UID-h which encountered the hazard.

Also, while it may be sufficient to deal with the potential ordering violation to only flush and re-execute load operations, in practice it may be simpler to flush and re-execute all types of operations in case there are dependencies on flushed loads (this avoids incurring extra circuit overhead in tracking the dependencies).

On the other hand, if at step 206 no valid hazarding entry is identified in the RAR buffer (either there are no younger operations indicated by valid RAR entries, or any such RAR entries for younger operations do not have the hazard indication 158 set to indicate that a hazard occurred) then at step 207 hazard checking for the load UID-x regarding the load tracking information 10 is complete and the load tracking circuitry 8 can proceed to perform checks for the next load, starting again at step 200 for that load.

If at step 205 it was determined that the load UID-x had acquire semantics, and so did impose a memory ordering requirement on younger loads even if those younger loads have a different address specified as the target address, then at step 214, the load tracking circuitry 8 again searches for a valid hazarding entry in the RAR buffer for which the UID field 156 specifies a valid UID-h which is younger than UID-x and the hazard indication 158 is set to indicate that a hazard has occurred, but in the case of a load with acquire semantics it is not necessary to compare the target address #addY of the load UID-x against the address #addH of the hazarding entry as the potential ordering violation may be identified independent of whether #addY corresponds to #addH of the hazarding entry. This is because a load has acquire semantics imposes an ordering requirement on younger loads even if they specify a different address.

If at step 214 a valid hazarding entry is identified then again at step 208 a risk of ordering violation is determined and the load tracking circuitry 8 issues the flush signal 12 to indicate that at least the hazarding load UID-h and any operations younger than that load should be flushed (although again it is also possible to flush and re-execute operations younger than UID-x but older than UID-h). Hence, step 214 is similar to step 206 except that detecting the ordering violation does not depend on an address comparison. If at step 214 no valid hazarding entry is detected then at step 207 the load tracking circuitry 8 proceeds to check the next load.

If at step 204 load UID-x was determined to be a value-predicted load then at step 210 the valid prediction circuitry 14 determines whether the predicted value for the target data of load UID-x matches the actual value of the target data obtained from the data store. If not, then a value misprediction is identified and so at step 212 operations (including both load and non-load operations) which are younger than the mispredicted load UID-x are flushed and re-executed. This prevents dependent operations which may have proceeded based on the incorrect predicted value from generating incorrect results as they are executed again using the actual value of the target data of the value-predicted load UID-x.

On the other hand, if at step 210 it is determined that the predicted value for the target data matches the actual value, so that the value prediction was correct, then at step 214 the value-predicted load is treated in the same way as a load with acquire semantics (even if the value-predicted load is not itself a load with acquire semantics). Hence, again the load tracking circuitry 8 and/or the value prediction circuitry 14 may determine, in the case of a correct value prediction, whether the RAR buffer includes a valid hazarding entry, which again is detected based on the UID-h of the hazarding entry indicating a younger instruction than UID-x of the value-predicted load and the hazard indication 158 being set, but is independent of any comparison of the target addresses #addY, #addH for the respective loads, so that even if the loads UID-h and UID-x are for different addresses then the risk of ordering violation may still be detected and flushing and re-execution of younger operations may be triggered at step 208 in the same way as discussed earlier. This helps to deal with a possible ordering violation which can be caused by the value prediction as discussed further with respect to FIG. 9 below. If the value-predicted load was correctly predicted (Y at step 210), but there is no valid hazarding entry found in the RAR buffer (N at step 214) then again at step 207 there is no need to carry out any flush and the processing can proceed to check the next load.

Figure 6:
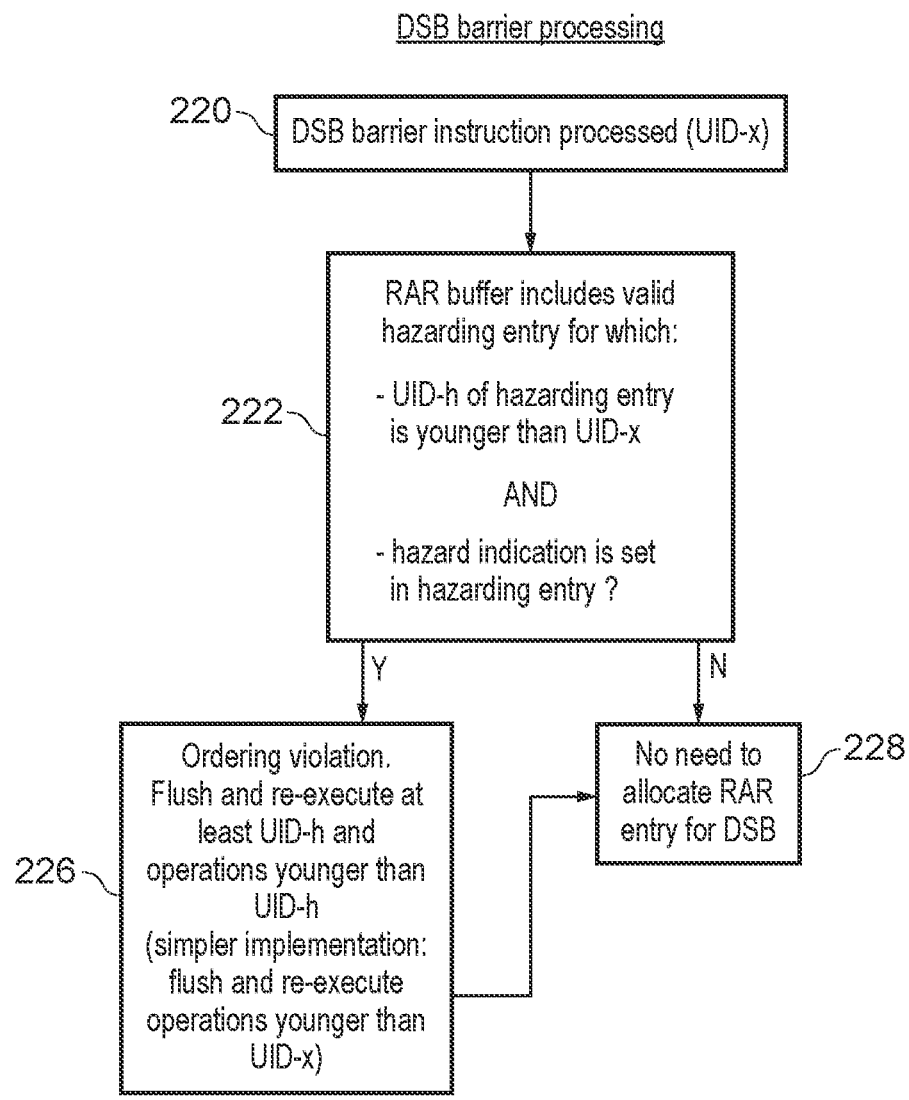
FIG. 6 is a flow diagram showing processing of a barrier instruction.

FIG. 6 shows an example of processing a data synchronisation barrier (DSB) instruction. At step 220 the DSB barrier instruction is processed. The DSB barrier instruction is associated with a given instruction identifier, UID-x. At step 222 the load tracking circuitry 8 detects whether the RAR buffer 10 includes a valid hazarding entry for which the UID field 156 indicates a younger UID-h than UID-x associated with the barrier instruction, and for which the hazard indication field 158 is set to indicate that the hazard has been detected. Note that (in comparison to step 206 of FIG. 5) for step 222 there is no requirement for the address field 154 of the hazarding entry to correspond with any address associated with the barrier instruction 220. Hence, the check for a DSB instruction may be similar to the check at step 214 for a correctly value-predicted load or a load with acquire semantics. If the UID-h of the hazarding entry is younger than the UID of the barrier and the hazard indication 158 is set then this is an indication that there is a potential that the younger instruction identified by UID-h could have been executed ahead of a load which preceded the barrier, and the setting of the hazard indication indicates that this has the potential to create incorrect results which are inconsistent with the results which would be achieved if the instructions had been processed in the order enforced by the barrier. Hence, at this point at step 226 a memory ordering violation is detected and operations younger than UID-h (and optionally instructions younger than UID-x and older than UID-h as well) are flushed and executed (this may be referred to as a 'nuke-next' operation), the same as at step 208 of FIG. 5. Again, in implementations which support merging of entries for the same address, the instructions younger than UID-x (including those older than UID-h) are flushed and executed for the same reason described earlier for step 208. On the other hand, if at step 222 there was no hazarding entry detected (so for each entry of the RAR buffer 10, the entry is either invalid, specifies an older UID than UID-x or has the hazard indication 158 clear) then no memory ordering violation is detected and so at step 228 there is no need to trigger the nuke-next operation. Regardless of whether the memory ordering violation was detected or not, for a DSB barrier instruction there is no need to allocate an RAR buffer entry 150 for the DSB barrier instruction (step 228 is reached after step 226 as well as on the 'N' branch of step 222). Note that the hazard checking with the RAR buffer 10 which is performed for the DSB barrier is similar to the hazard checking done in FIG. 5 for a load with acquire semantics, except that for the DSB barrier there is no need to also allocate an RAR entry as in step 202 of FIG. 5 because this is not itself a load operation.

Figure 7:
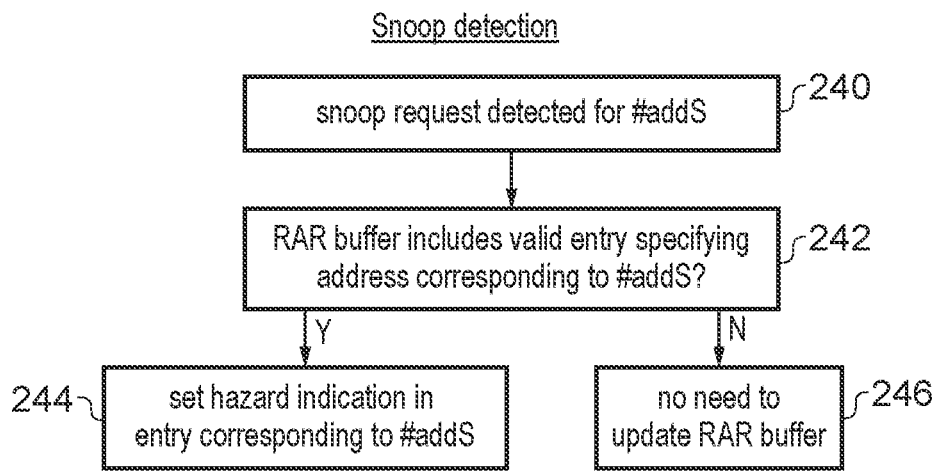
FIG. 7 is a flow diagram showing updating of the RAR buffer in response to detection of a snoop request.

FIG. 7 is a flow diagram showing use of the RAR buffer 10 when snoop requests are detected for a given snoop address #addS. This snoop may be issued by interconnect 42 to one or more of the caches 130, 132, 134, for example based on a coherency scheme for maintaining coherency between these caches and caches in other processing elements of the same processing system. At step 240 the snoop request is detected. In response to the snoop request, at step 242 the load tracking circuitry 8 detects whether the RAR buffer includes a valid entry 150 which specifies an address corresponding to the snooped address #addS. If so, then at step 244 the hazard indication field 158 in the valid entry corresponding to #addS is set. If there is no valid entry in the RAR buffer 10 corresponding to #addS then at step 246 there is no need to update the RAR buffer 10 in response to the snoop request 240. Note that in some cases the steps performed in FIG. 7 may be performed only in response to certain types of snoop request and there may be other types of snoop request which do not require updating of the RAR buffer at all.

Figure 8:
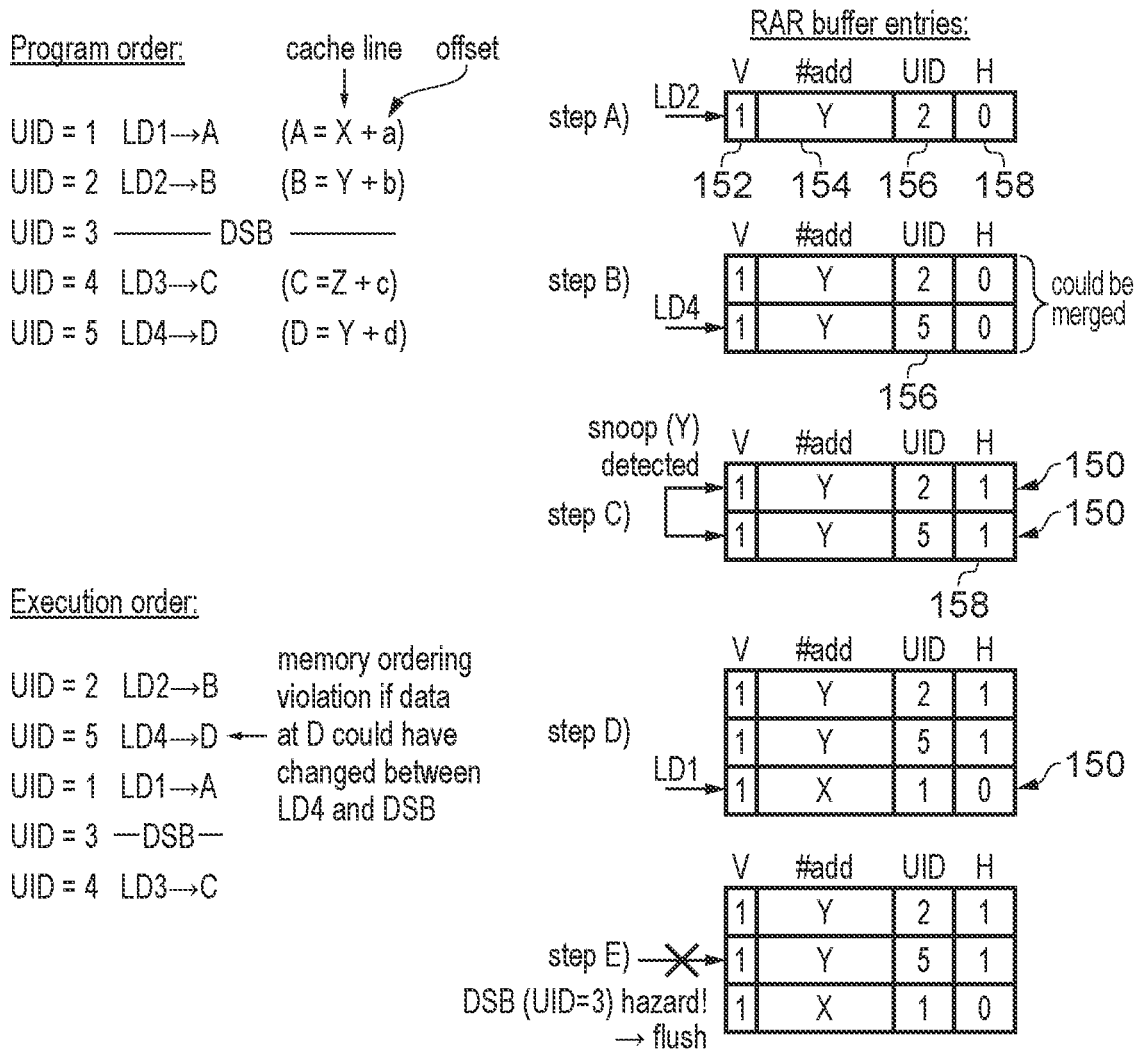
FIG. 8 shows a worked example illustrating use of the RAR buffer for detecting memory ordering violations.

FIG. 8 shows a worked example illustrating detection of a memory ordering violation using the RAR buffer 10 (in this example, the memory ordering requirement is caused by a barrier instructions). The top left part of FIG. 8 shows several load operations to be processed, arranged in program order, relative to a barrier instruction DSB. Each instruction is assigned a UID, and the UIDs are assigned in an order corresponding to the program order. Although FIG. 8 shows consecutive UIDs 1-5 for the respective instructions, it will be appreciated that in practice these loads may be separated by other types of non-load or barrier instruction and so it is possible that the UIDs for the respective instructions may not be consecutive.

Accesses to memory may be controlled within the memory system 6 in units of data having a certain size referred to as a cache line, so that even if a given load operation only requires a certain part of the data from that cache line, the memory system may nevertheless return the entire cache line. This can help with improving performance as it is quite common that if a load requests one part of the cache line, a subsequent load may request another part of the same cache line. Typically, caching within the caches 130, 132, 134 and/or coherency management based on the snoop requests may be tracked using addresses at the granularity of an individual cache line. Hence, for consistency with this tracking, the addresses 154 in the RAR buffer may also indicate an address of an entire cache line and may not distinguish between which particular byte portion is accessed by an individual load operation within a cache line. As shown in the top left part of FIG. 8 the addresses A-D of the respective loads could be formed using a first portion X, Y or Z which identifies the cache line to be accessed and a second portion a-d which indicates an offset within the cache line. In this example the addresses B and D are such that they are accessing different offsets within the same cache line and so they share the same cache line portion Y but have different offsets b, d. Hence, as the address tracking 154 in the RAR buffer 10 is at the granularity of cache lines these loads would be seen as accessing the same address even though they are actually accessing different offsets within the same cache line. The use of '+' to indicate the combination of the cache line portion and offset portion does not imply an addition would be needed to combine the cache line and offset—in practice the cache line portion may be a most significant bit portion of the address and the offset portion a least significant bit portion and so the resulting address can be obtained by concatenating the two portions. Also, while not shown in FIG. 8, in some implementations of the address field 154 of a RAR buffer entry may be set based on a hash of the cache line portion, which could differ in value to the cache line portion of the address itself.

As shown in the bottom left part of FIG. 8, due to out of order processing by the processing pipeline 4, the execution order in which the load operations are actually carried out may be different from the program order. For example, if the load LD1 is stalled because its address operands are not ready yet, then other load operations LD2, LD4 may be performed ahead of it.

The barrier instruction DSB signals that there is an architectural requirement for the results of processing to be consistent with the results that would be achieved if none of the loads LD3, LD4 which follow the barrier instruction DSB are executed ahead of any of the older loads LD1, LD2 which precede the barrier instruction in the program order. Hence, while the ordering requirement imposed by the barrier instruction may be respected if LD2 is reordered ahead of LD1, because these are all instructions on the same side of the barrier, or if LD4 is reordered ahead of LD3, it is a disagreement with the ordering requirement for LD3 or LD4 to be performed ahead of either LD1 or LD2. Hence, in the example of the execution order shown at the bottom left of FIG. 8 there is a memory ordering disagreement because load LD4 has been executed before load LD1.

This disagreement between the execution order and the memory ordering requirements imposed by the barrier instruction can be tolerated, provided that there is no possibility that data associated with address D of load LD4 changed between the actual execution of load operation LD4 and the execution of the barrier instruction DSB. However, if the data associated with address D could have changed then it is possible that the disagreement with the memory ordering requirement could have caused the wrong results and in the case it would be needed to re-execute load operation LD4.

The right hand part of FIG. 8 illustrates updating of the RAR buffer 10 in response to the operations shown in execution order at the bottom left of FIG. 8. At step A, load operation LD2 is executed to address B and so the cache line portion Y of the address (or a hash of this portion) is allocated into a new RAR buffer entry 150 specifying the UID=2 for load operation LD2 and the hazard flag 158 is clear when that entry is initially allocated. In FIG. 8, for conciseness only valid entries 150 of the RAR buffer relating to the particular instructions shown in the examples on the left-hand side of FIG. 8 are shown and any other RAR buffer entries are omitted.

At step B, the load operation LD4 is executed to address D within cache line Y and so a RAR buffer entry which is valid and corresponds to the address Y and UID 5 is allocated into the RAR buffer. As mentioned above it is possible for entries to be merged if desired as the entries for LD2 and LD4 both relate to the same cache line address Y. If the entries are merged then the UID field 156 of the merged entry would take the UID of the younger of the loads associated with the merged entries (e.g. UID 5 in this example). However, in the particular example shown in FIG. 8 these entries are not merged.

At step C in the example of FIG. 8 a snoop request specifying the cache line address Y is detected and so the hazard fields 158 of any entries corresponding to address Y are set. This is not in itself a problem because if no disagreement with the memory ordering requirement occurs, then the presence of the hazard would not have affected the correctness of the results. Hence, processing continues despite the hazard having been detected and marked within the RAR buffer entries associated with address Y.

At step D the load operation LD1 is executed and as this does not correspond to the UID or the address of any existing entry, a new RAR buffer entry 150 is allocated for address X and UID1 associated with load LD1, and the hazard flag is set to 0 in that entry. Although LD1 has an older UID than the existing entries for LD2 and LD4 with the hazard flag set, this is still not in itself a problem because LD1 relates to a different address to the address Y of existing entries (and is not a load with acquire semantics in this example) and so this does not violate the requirement to execute loads to the same address in program order, and if there is no subsequent barrier instruction then there is no restriction on reordering load LD2 or LD4 ahead of load LD1.

However, at step E of FIG. 8 the barrier instruction DSB is encountered and the DSB introduction has a UID of 3. On looking up the RAR buffer, the load tracking circuitry 8 detects that there is at least one existing entry which has a younger UID (5) than the UID (3) of the DSB instruction and which has the hazard flag set, and therefore the nuke-next operation is triggered which will cause any instructions with younger UIDs than the DSB instruction to be flushed from the pipeline, and will cause program execution to restart from the UID 4 of the next instruction after the DSB instruction, which will therefore cause the load operation LD4 (which was executed early in violation with the ordering requirement) to be re-executed so that it will then see the updated results of any updates to address Y which caused the issuing of the snoop request detected at step C. Once load LD4 has been re-executed the processing will then have generated results consistent with those required by the ordering requirement.

At steps A, B and D of FIG. 8, when a new entry of the RAR buffer is allocated then any invalid entry may be selected for use of the new entry. Entries may be invalidated from the RAR buffer when the write back stage 122 confirms that the corresponding UID has been committed. If a given load is to be processed and there are no invalid RAR buffer entries 150 spare then processing of load operations may be stalled until a spare entry can be recovered.

Barriers are not the only memory ordering requirement—it will be appreciated that the RAR used as shown in FIG. 5 also enables detection of memory ordering violations involving loads to the same address executed out of program order.

Figure 9:
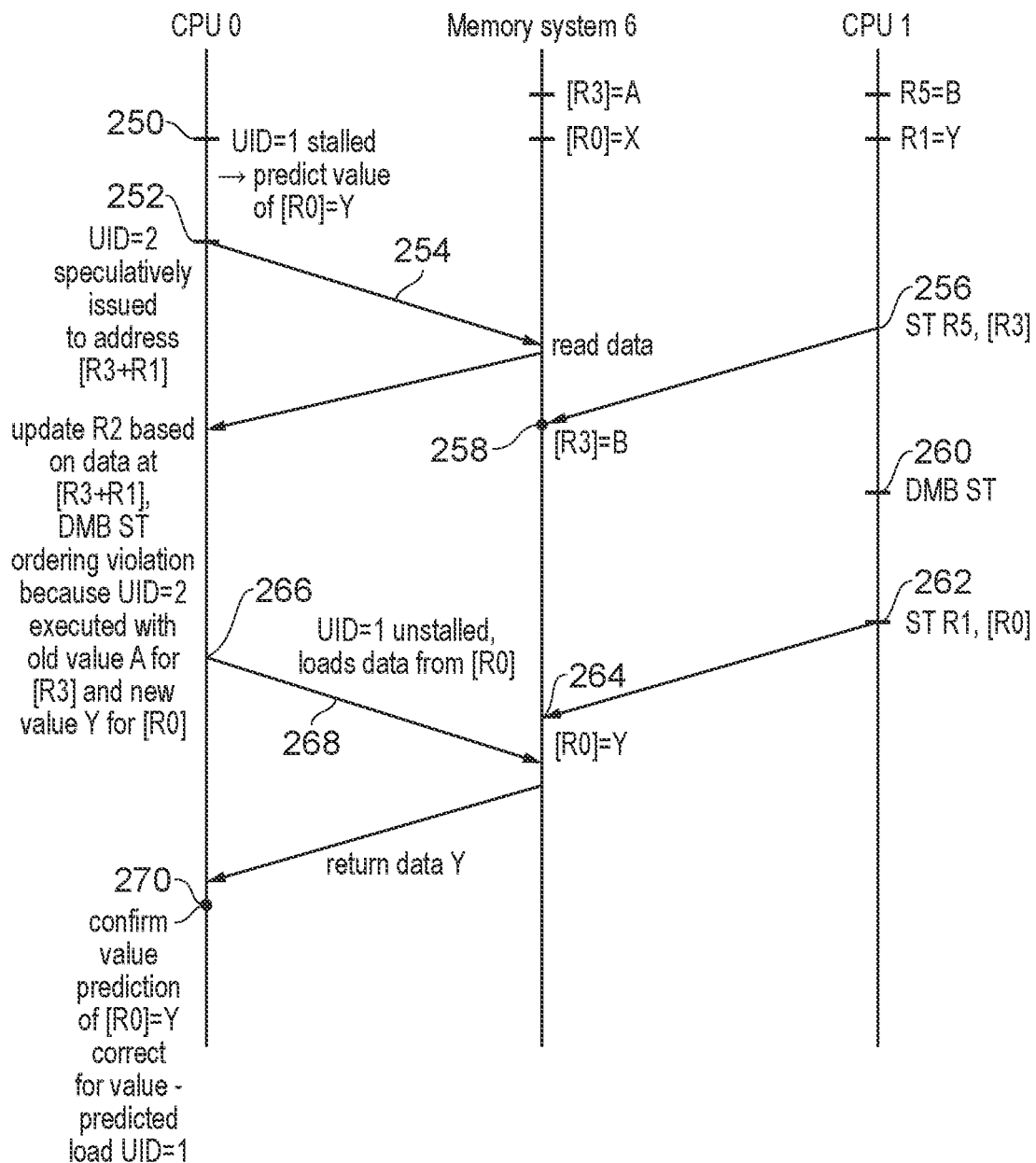
FIG. 9 shows an example of a potential ordering violation that may be caused by a value prediction.

FIG. 9 illustrates a worked example showing how an ordering violation may arise due to a value prediction made for a value-predicted load. FIG. 9 shows a code example where the two CPUs 0 and 1 in the system shown in FIG. 2 are each executing some code which interacts via some shared variables. In this example the shared variables are the data stored at addresses that are identified as [R0] and [R3]. For ease of understanding, it is assumed that the code on both CPU0 and CPU1 are using the same registers R0 and R3 to store the address information for computing the addresses of [R0] and [R3], but it will be appreciated that this would not be essential and even if CPU1 was using different registers to store the address information for these variables compared to CPU0 there could still be a similar issue if they access the same address.

Hence, CPU0 executes a first load operation (identified using UID=1) which is a value-predicted load in the example described below and acts to load register R1 with the data value stored at an address [R0] computed based on a value in register R0. The CPU0 also executes a second load operation (UID=2) that loads register R2 with a data value obtained from an address [R3+R1] which depends both on the value loaded into R1 from address [R0] by the first load and on the value of the other shared variable at address [R3]. In this example, it is assumed that the value in R1 is a one-bit flag (having a value 0 or 1) so that the address [R3+R1] will be in the same cache line as the address [R3], regardless of the value of R1. For example, [R1] may be a flag variable which controls which particular byte of data should be accessed within the cache line indicated by the address [R3]. This means that, as the addresses [R3] and [R3+R1] are in the same cache line, these addresses cannot be distinguished by snoop requests (which track addresses at granularity of cache line) and so an update of the data at address [R3] triggered by CPU1 would cause a hazard indication to be set for the RAR buffer entry associated with the load UID=2 to address [R3+R1].

Hence, the second load depends on both of the shared variables [R0] and [R3] which the code on CPU1 also interacts with. Also the second load on CPU0 has an address dependency on the first load due to using register R1 for calculating the address of the second load.

The code on CPU1 includes two store operations for updating the values of the shared variables at addresses [R3] and [R0]. The code on CPU1 also includes a store memory barrier DMB ST appearing between the first store updating the data at address [R3] and the second store updating the data at address [R0], which imposes an ordering requirement that the view of data in memory seen by other observers (such as the code running on CPU0) must be consistent with the outcome which would arise if the first store to update the data at address [R3] on CPU1 was executed before the second store to update the data at address [R0]. Hence, it would not be allowed for another observer to see the updated value for the data at address [R0] while seeing the old value for the data at address [R3]. Of course, the code executing on CPU0 (and the hardware logic of CPU0 itself) does not have any visibility of what operations are happening at CPU1, but the system can be designed so that the effects of the code executing on CPU0 do not cause any inadvertent violation of any ordering constraints which may have been imposed by the code at CPU1.

FIG. 9 shows a ladder diagram illustrating a flow of operations on CPU0 and CPU1 as they interact with the memory system 6. Here, the memory system 6 could include private caches 48 of the respective CPUs or could include a shared cache 50 or main memory 46—if data is accessed in private caches 48 then the interconnect 42 may act to maintain coherency between the caches on CPU 0 and CPU1.

Initially, before either CPU starts executing its code, the values of the shared variables are that the data at address [R3] is equal to A and the data at address [R0] is equal to X. It is assumed that the values in registers R5 and R1 of CPU1 are set to values B and Y respectively so that when the respective stores execute these will change the values at addresses [R3] and [R0].

At step 250, CPU0 reaches the first load UID=1 and finds that its operation is stalled, for example because it is waiting for older instructions to calculate operands needed to calculate the address [R0]. Therefore, the actual load operation for UID=1 cannot be issued yet and normally one would expect that as UID=2 is dependent on UID=1 then this would also stall UID=2. However, as CPU0 has the value prediction circuitry 14, CPU0 is able to make a prediction of what the data value from address [R0] will be and on this occasion predicts that the data value at address [R0] is Y. For example this may be based on prediction state information which may have observed on a number of previous occasions that loads to address [R0] tended to return the data value Y. Alternatively, rather than basing value predictions on the target address of the location in memory from which data is to be loaded, the predictions could be based on a program counter address associated with the load UID=1, if it is identified that a load instruction having a particular program counter address tends to return a certain data value. Regardless of how the value prediction is obtained, once a predicted value for the data value being loaded to register R1 by load UID=1 is available, then this breaks the dependency between load UID=2 and load UID=1 and so at step 252 the second load can be speculatively issued based on the value prediction. Hence, in this case the load request 254 for the second load with UID=2 is issued to an address [R3+R1]. The data at address [R3+R1] is read from the memory system 6 and written to register R2. Hence, by supporting the value prediction, this allows a younger load to execute earlier than would have been possible without value prediction.

In the meantime, the code at CPU1 is executing and at step 256 the first store instruction executes and stores the value in register R5 to the memory system location associated with address [R3], and so at step 258 the data corresponding to address [R3] is updated to the value B. CPU1 then executes the store barrier at step 260 which ensures that the younger store operation cannot bypass the older store operation. At step 262 the younger store operation is executed by CPU1 and this causes the data at memory system location corresponding to address [R0] to be updated to the value in register R1 and hence set to data value Y, at step 264. Note that the order of the operations performed by CPU1 was correct and respects the barrier indicated by DMB at step 260.

Meanwhile, at step 266 at CPU0, the first load with UID=1 is unstalled (e.g. when its address calculation operands become available) and so then it issues a load request 268 to the memory system to obtain the data associated with address [R0] and in this example by the time that load request 268 is issued the data at [R0] has already been updated to the new value Y at step 264 in response to the second store of CPU1. This data Y is returned to CPU0 in response to the load request and then at step 270 the value prediction circuitry 14 checks whether the returned data matches the predicted value of the data at address [R0] that was predicted back at step 250, and in this case the prediction was correct and so it appears that the outcome of the younger load with UID=2 was also correct and so no operations will need to be re-executed.

However, actually the functional outcome of this example is incorrect because it violates the store ordering imposed by the store barrier on CPU1. This is because the second load on CPU0 has executed using the old data value A associated with address [R3] from before the older store was executed on CPU1 but due to the value prediction has it executed with a newer data value Y of the data at address [R0] which was updated by a younger store which follows the store barrier. Note that as the data in [R0] is merely being used as a flag which affects which particular byte of the cache line indicated by [R3] is accessed by the second load UID=2 on CPU0, the update of the data at [R3] to the new value B (which could be multiple bytes) performed by the first store on CPU1 may also change the value at address [R3+R1].

Effectively, this means that CPU0 has gained a view of memory which would have arisen if the younger store had bypassed the older store on CPU1 which would be in contravention with the store barrier, even though at CPU1 the younger store did not bypass the older store. This arises because while the second load on CPU0 is issued at step 252 and sees the value of the data at address [R3] that is consistent with the view of memory at that time, the second load has seen the value of the data at [R0] equivalent to a point in time in the future after step 264 when the data at [R0] was updated.

Figure 10:
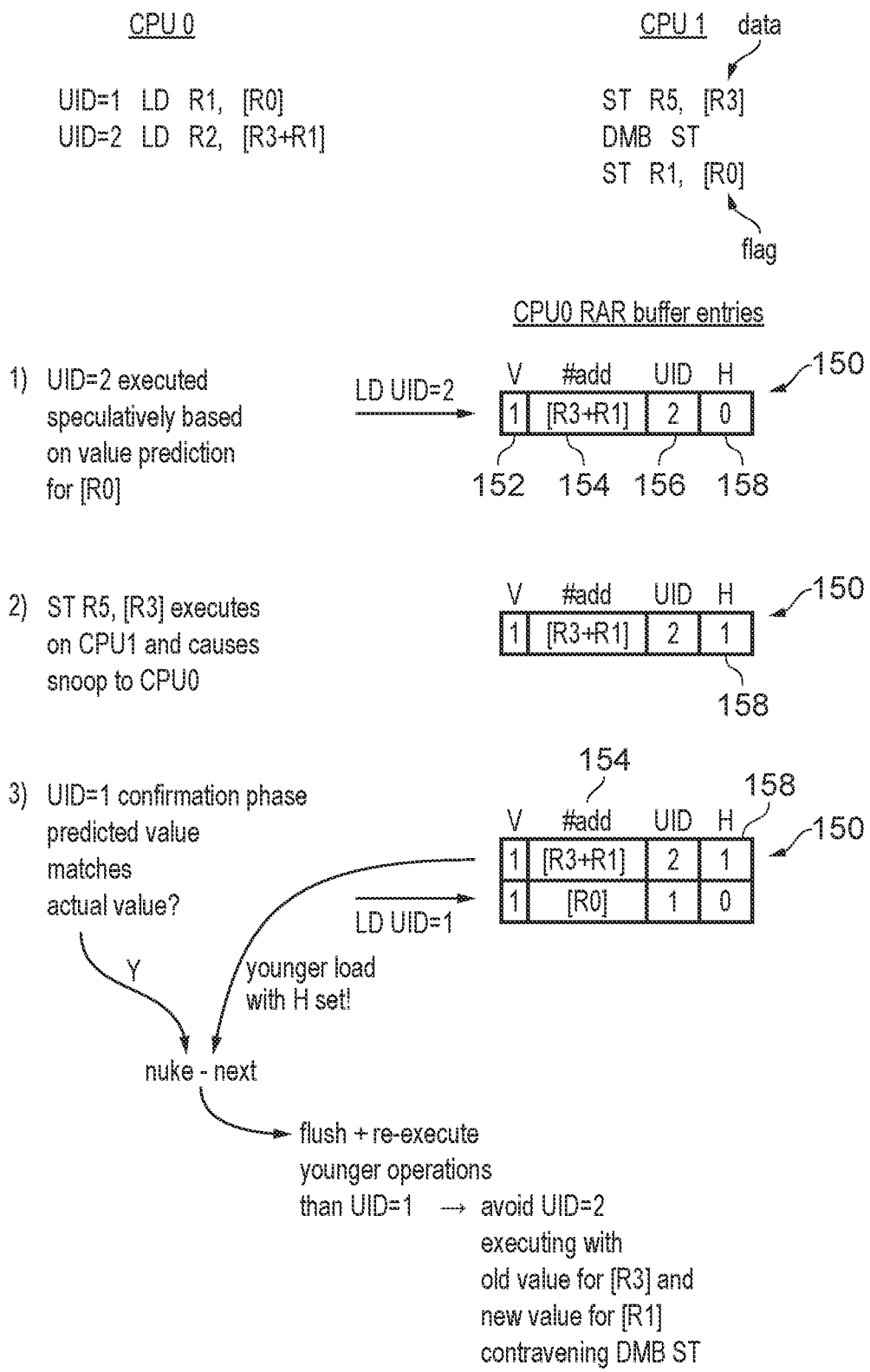
FIG. 10 illustrates an example of using the load tracking information to identify such ordering violations and cause operations to be re-executed to avoid the ordering violation.

FIG. 10 shows how the check performed at step 214 of FIG. 5 for a value-predicted load when its value prediction was correct can address this problem and prevent the ordering violation causing incorrect results. FIG. 10 is using the same worked example as shown in FIG. 9. The lower part of FIG. 10 shows the RAR buffer entries 150 which are updated in response to the operations seen at CPU0. At the first step shown in FIG. 10, after making the value prediction for UID=1, the second load with UID=2 is issued speculatively at CPU0 based on the predicted value for [R0]. Following the approach shown in FIG. 5, at step 202 an RAR buffer entry 150 is allocated for the load with UID=2, with the valid bit 152 set, the address field 154 set based on address [R3+R1], the UID field 156 set to 2 to match the UID of the second load and the hazard flag 158 initially set to 0. It is assumed in this example that there are no younger operations with RAR buffer entries indicating a hazard and so there is no need to flush at this point.

At step 2 of FIG. 10 when the first store operation is executed by CPU1 at step 256 of FIG. 9 to update the data value at address [R3], the write request sent to the interconnect 42 causes a snoop request to be sent from the interconnect 42 to the CPU0 specifying address [R3], and the address [R3] of this snoop request is compared by the load tracking circuitry 8 against addresses of entries in the RAR buffer to check whether any hazards have occurred. In this example as address [R3] corresponds to the same cache line as address [R3+R1] in the entry for UID=2, the hazard indication 158 is set for this RAR buffer entry 150.

Subsequently at step 3 the first load UID=1 on CPU0 is unstalled and initiates its confirmation phase to issue the load request 268 to read data from [R0]. Once the loaded value Y is returned then it is confirmed that the actual value of the target data matches the predicted value and so at step 214 of FIG. 5 the RAR buffer check is performed to check for hazarding entries relating to younger load operations, but there is no need to confirm that the address field 154 of those hazarding entries corresponds to the address of the value-predicted load with UID=1. Therefore, as the RAR buffer entry 150 for UID=2 indicates a younger load with the hazard indication 158 set (even though the entry for UID=2 has a different address [R3+R1] to the address [R0] in entry for UID=1), the load tracking circuitry 8 issues a "nuke-next" and flushes and re-executes operations younger than UID=1 to avoid UID=2 having been executed with the old value A for the data at address [R3] and the new value Y for the data at address [R0] contravening the store barrier on CPU1. Hence, the load for UID=2 will be flushed and later re-executed and at that point it will see the new values B, Y for the data at addresses [R3] and [R0], so there would be no ordering violation.

Hence, by converting a value-predicted load into a load with acquire semantics in its confirmation phase, so as to perform the same RAR buffer checks independent of address comparisons that would be done for loads with acquire semantics, this protects against potential ordering violations caused by value predictions.

Note that if the value at [R0] had not merely been a 1-bit flag, but had been a multi-bit value with sufficient number of bits that [R3+R1] would be in a different cache line to [R3], then there would be no incorrect result caused by an ordering violation, even if the value prediction for load UID=1 on CPU0 used a predicted value Y for [R0] which corresponds to the new value set by the second store on CPU0 but used the old value A for [R3] which does not take account of the first store on CPU0. In this case, although the second load UID=2 CPU0 has not considered the update made by the first store on CPU0 in its execution, this does not matter anyway because the cache line accessed by the second load [R3+R1] would be different to the cache line [R3] updated by the first store executed by CPU1, so that there is no intervening change to data in a cache line that is relevant to the execution of the second load on UID=2. The functional result will be the same as if no value prediction was made and the execution of the second load UID=2 was deferred until the actual value Y of the data at address [R0] was available. Hence, there would be no need to flush and re-execute in this scenario. In this scenario, the snoop at step 2 of FIG. 10 would specify address [R3] and the address [R3+R1] in address field 154 of the entry for UID=2 would be in a different cache line, so the hazard indication 158 would not be set and so there would be no need for a flush at step 3.

In the present application, the words "configured to . . ." are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope of the invention as defined by the appended claims.

The invention claimed is:

1. An apparatus comprising:
processing circuitry to issue load operations to load data from a data store;
load tracking circuitry to maintain tracking information for one or more load operations issued by the processing circuitry; and
value prediction circuitry to determine a predicted value of first target data to be loaded from the data store by a value-predicted load operation specifying a first target address, to allow a dependent operation which depends on the first target data to be speculatively issued before an actual value of the first target data is loaded from the data store in response to the value-predicted load operation; in which:
in response to the actual value of the first target data becoming available for the value-predicted load operation, at least one of the load tracking circuitry and the value prediction circuitry is configured to:
determine whether the actual value of the first target data matches the predicted value of the first target data determined by the value prediction circuitry for the value-predicted load operation;
determine whether the tracking information indicates that, for a given load operation younger than the value-predicted load operation and issued before the actual value of the first target data was available, there is a risk of second target data associated with a second target address of the given load operation having changed after the second target data was loaded by the given load operation; and
independent of whether the first target address corresponds to the second target address, request re-processing of at least the given load operation when the actual value of the first target data is determined to match the predicted value of the first target data and the tracking information is determined to indicate that there is a risk of the second target data having changed after the second target data was loaded by the given load operation.

2. The apparatus according to claim 1, in which when a mismatch is detected between the actual value of the first target data and the predicted value of the first target data, said at least one of the load tracking circuitry and the value prediction circuitry is configured to request re-processing of at least one operation younger than the value-predicted load operation.

3. The apparatus according to claim 2, in which, when the mismatch is detected between the actual value of the first target data and the predicted value of the first target data, said at least one of the load tracking circuitry and the value prediction circuitry is configured to request re-processing of the at least one operation, independent of whether the tracking information indicates that there is a risk of target data loaded by a younger load operation younger than the value-predicted load operation having changed after being loaded by the younger load operation.

4. The apparatus according to claim 1, in which when, for the value-predicted load operation, the actual value of the first target data is determined to match the predicted value of the first target data and the tracking information is determined to indicate that there is a risk of the second target data having changed after the second target data was loaded by the given load operation, said at least one of the load tracking circuitry and the value prediction circuitry is configured to request re-processing of any already issued load operation younger than the value-predicted load operation.

5. The apparatus according to claim 1, in which:
in response to a non-value-predicted load operation specifying a third target address, where the non-value-predicted load operation does not impose a memory ordering requirement on younger load operations specifying a different target address to the third target address:
when the tracking information indicates that there is a risk of target data loaded by a younger load operation younger than the non-value-predicted load operation having changed after being loaded by the younger load operation, the load tracking circuitry is configured to determine whether to request re-processing of at least the younger load operation, depending on whether a target address of the younger load operation corresponds to the third target address of the non-value-predicted load operation.

6. The apparatus according to claim 1, in which the load tracking circuitry is configured to maintain, as the tracking information, a tracking structure comprising one or more tracking entries, each tracking entry allocated for an issued load operation specifying at least:
an age indicator indicative of relative age of the issued load operation;
address information indicative of an address of the issued load operation; and
a hazard indication indicative of whether a hazard condition has been detected for the issued load operation.

7. The apparatus according to claim 6, in which the load tracking circuitry is configured to set the hazard indication for a given tracking entry of the tracking structure to indicate that the hazard condition has been detected, in response to detecting a coherency snoop request specifying a snoop address corresponding to the address information specified by the given tracking entry.

8. The apparatus according to claim 6, in which said at least one of the load tracking circuitry and the value prediction circuitry is configured to determine that the tracking information indicates that there is a risk of the second target data having changed after being loaded by the given load operation when the tracking structure includes a hazarding tracking entry for which the age indication indicates a younger load operation than the value-predicted load operation and the hazard indication indicates that the hazard condition has been detected for the younger load operation.

9. The apparatus according to claim 1, comprising a plurality of processing elements each having access to a shared data store, each processing element comprising the processing circuitry, and at least one of said plurality of processing elements comprising the load tracking circuitry and the value prediction circuitry.

10. A method comprising:

maintaining tracking information for one or more load operations issued to load data from a data store;

determining a predicted value of first target data to be loaded from the data store by a value-predicted load operation specifying a first target address, to allow a dependent operation which depends on the first target data to be speculatively issued before an actual value of the first target data is loaded from the data store in response to the value-predicted load operation; and in response to the actual value of the first target data becoming available for the value-predicted load operation:

determining whether the actual value of the first target data matches the predicted value of the first target data determined by the value prediction circuitry for the value-predicted load operation;

determining whether the tracking information indicates that, for a given load operation younger than the value-predicted load operation and issued before the actual value of the first target data was available, there is a risk of second target data associated with a second target address of the given load operation having changed after the second target data was loaded by the given load operation; and independent of whether the first target address corresponds to the second target address, requesting re-processing of at least the given load operation when the actual value of the first target data is determined to match the predicted value of the first target data and the tracking information is determined to indicate that there is a risk of the second target data having changed after the second target data was loaded by the given load operation.

* * * * *